INVENTORS
CORNELIUS F. WEISS, JR
EDMOND P. DI CAMBIO
BY Murray Names
ATTORNEY

April 28, 1959　　C. F. WEISS, JR., ET AL　　2,884,191
ELECTRONIC COMMUTATOR

Filed April 6, 1953　　　　10 Sheets-Sheet 5

INVENTORS
CORNELIUS F. WEISS, JR.
BY　EDMOND P. DI CAMBIO

Murray Nones
ATTORNEY

April 28, 1959 C. F. WEISS, JR., ET AL 2,884,191
ELECTRONIC COMMUTATOR
Filed April 6, 1953 10 Sheets-Sheet 6

*INVENTORS*
CORNELIUS F. WEISS, JR
EDMOND P. DI CAMBIO
BY Murray Nanes
ATTORNEY

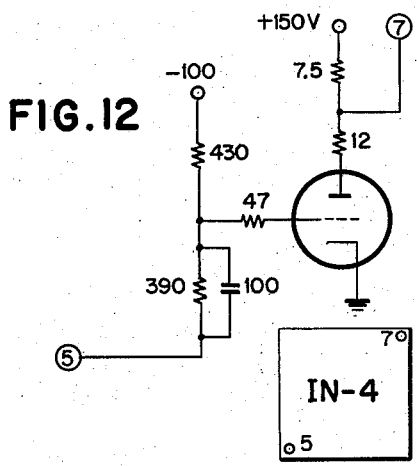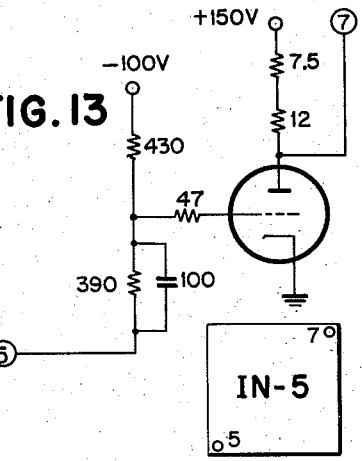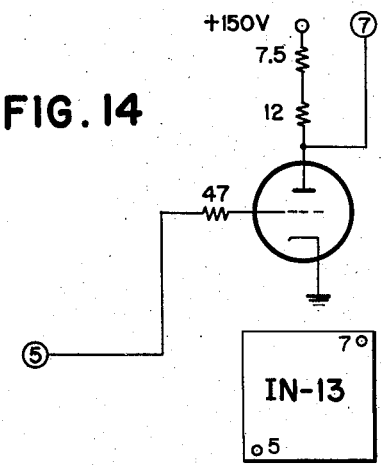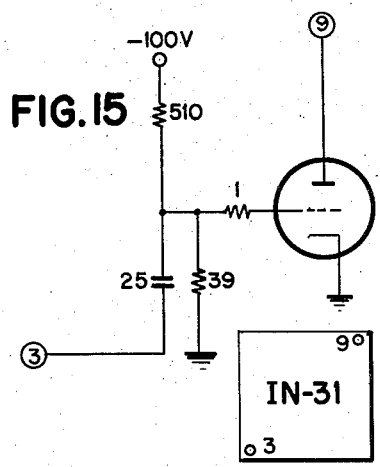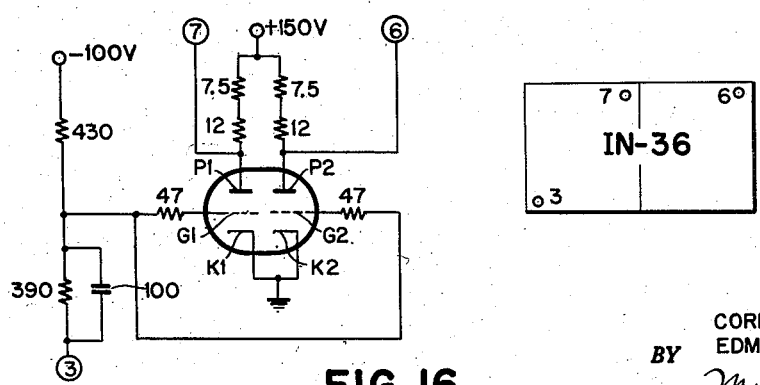

April 28, 1959     C. F. WEISS, JR., ET AL     2,884,191
ELECTRONIC COMMUTATOR

Filed April 6, 1953     10 Sheets-Sheet 8

*INVENTORS*
CORNELIUS F. WEISS, JR.
EDMOND P. DI CAMBIO
BY *Murray Nones*
ATTORNEY

*INVENTORS*
CORNELIUS F. WEISS, JR.
EDMOND P. DI CAMBIO
BY
*ATTORNEY*

April 28, 1959  C. F. WEISS, JR., ET AL  2,884,191
ELECTRONIC COMMUTATOR

Filed April 6, 1953  10 Sheets-Sheet 10

INVENTORS
CORNELIUS F. WEISS, JR.
EDMOND P. DI CAMBIO
BY  Murray Nanes
ATTORNEY

United States Patent Office 2,884,191
Patented Apr. 28, 1959

2,884,191

ELECTRONIC COMMUTATOR

Cornelius F. Weiss, Jr., Beacon, and Edmond P. Di Cambio, Poughkeepsie, N.Y., assignors to International Business Machines Corporation, New York, N.Y., a corporation of New York Application April 6, 1953, Serial No. 346,934

8 Claims. (Cl. 235—152)

This application relates to calculator programming and more particularly to skipping and suppressing of program steps in an electronic commutator type program control unit.

In the patent to R. L. Palmer et al. 2,658,681, issued November 10, 1953, there is disclosed a combination of machines, for carrying out complex calculations, consisting of an electronic calculator and a summary punch. The calculator includes as certain elements thereof, a number of electronic storage units, an electronic accumulator and a program unit. The summary punch in addition to its punching functions is employed to read cards and feed the factors taken therefrom into these storage units. The entry and exit positions of all these storage units and of the accumulator are commonly internally connected to an exit channel and an entry channel, the factors being transferred from the storage units to the accumulator or vice versa over these channels under control of the program unit which controls the transfers in a desired sequence. All calculations take place in the accumulator which during multiplication and division acts jointly with a multiplier-quotient unit. The results are then read out from the calculator to the summary punch where they are punched in the same record cards from which the original factors were read.

The program unit of the calculator supplies a series of sequential voltages to output hubs which thus indicate which program step is On and activates any program functions which may be plug wired to the hubs. The program unit is an open electronic ring which advances, one step at a time, and shuts itself off after running its course of steps. The length of one program step, except when multiplying or dividing, is one cycle of a primary timer ring. The program ring is stepped along by pulses from the primary timer which comprises a closed electronic ring that advances, step by step, to the last stage and then repeats its operation.

More specifically, the primary timer is advanced from its first position, by pulses from a multivibrator, and each time it reaches its second step, it emits a pulse which advances the program ring, one step. The primary timer ring in addition to driving the program open ring, controls circuits which develop gating pulses and other pulses for determining the sequence of operation, within a particular program step. These gating pulses, it is to be particularly noted, are not developed, until the "active" portion of the primary timer cycle, which, again it must be particularly noted, does not begin until the third primary step.

In the calculator disclosed in said Palmer et al. Patent, the program unit is (with the exception noted in said above-mentioned application), inflexible, in that once it is pluggably wired for a desired sequence, it must continue through and actually carry out the steps of that particular sequence for which it was plugged. The novel means of the present invention provide an extremely flexible combination of primary timer and program unit in which a novel skip and suppress circuit is provided between the second and third primary timer steps, which circuit is controlled in a novel manner to determine whether subsequent multivibrator pulses will advance the primary timer ring to the third step, which as stated above, initiates the "active" portion of the cycle, or whether the primary timer shall be returned to its second step to thus advance the program ring but without performing any program function.

This novel skip and suppress circuit, and associated control circuits therefor, steps the program ring, at an increased rate, through one step (called suppress) or more than one program steps (called skip) without carrying out the detailed steps of these particular program functions for which these particular steps are pluggably wired. Wherever used, the term "suppress" means to move through a single program step only, without performing the particular program function plugged to that step while "skip" means to move through two or more program steps, without performing the particular program functions plugged to these steps.

The principal object of this invention therefore is to provide a more flexibly operable calculator program unit, for a computer such as is disclosed in said above-mentioned application and to provide a more flexibly operable program unit for any program controlled system.

Another object is to provide an improved circuit capable of suppressing and rapidly advancing past a predetermined program step in a pluggably wired type of calculator program.

Still another object is to provide a circuit capable of rapidly skipping one or more groups of predetermined consecutive program steps in a pluggably wired type of calculator program.

Another object is to provide a calculator program unit for suppressing a program step without taking the full time that is ordinarily required for that step to perform its function.

A further object is to provide a calculator program unit adaptable to skip one or more groups of consecutive program steps without taking the full time that is ordinarily required for these steps to perform their function.

Another object is to provide in combination, a primary timer ring and a program ring in which the primary timer ring controls the rate of advancement of a program ring, which is advanced each time a fixed step in the primary timer ring is activated, by providing a path, shorter than the complete primary timer ring path, for returning to the fixed step.

Still another object is to provide in a primary timer ring including a stepping element to advance a program ring, a series of delay elements connected to said stepping element for selectively returning to that primary timer stepping element, without advancing to the "active" portion of the primary timer ring, during which calculations occur.

Another object is to provide in combination a calculator program unit selectively operable to quickly skip or not skip a group of program steps and means controlled by test means operable in a previous program step for selectively producing or not producing said rapid skipping.

Still another object is to provide a calculator program unit capable of preventing skipping of a consecutive group of program steps, by suppressing the first step to be skipped.

A further object is to provide a calculator program unit of great flexibility for effectively rendering operable a plurality of program sequences from a single pre-plugged program sequence, by suppressing or skipping certain program steps of said sequence.

Other objects of the invention will be pointed out in the following description and claims, and illustrated in the accompanying drawings, which disclose by way of example, the principle of the invention and the best mode which has been contemplated of applying that principle.

In the drawings:

Figs. 1A, 1B and 1C comprise a complete wiring diagram showing a portion of a computer embodying the preferred form of the invention, these figures to be assembled side by side, as indicated.

Figs. 12, 13, 14, 15 and 16 are detailed circuit diagrams and the respective block representations of inverter circuits employed in the invention.

Figure 1A:
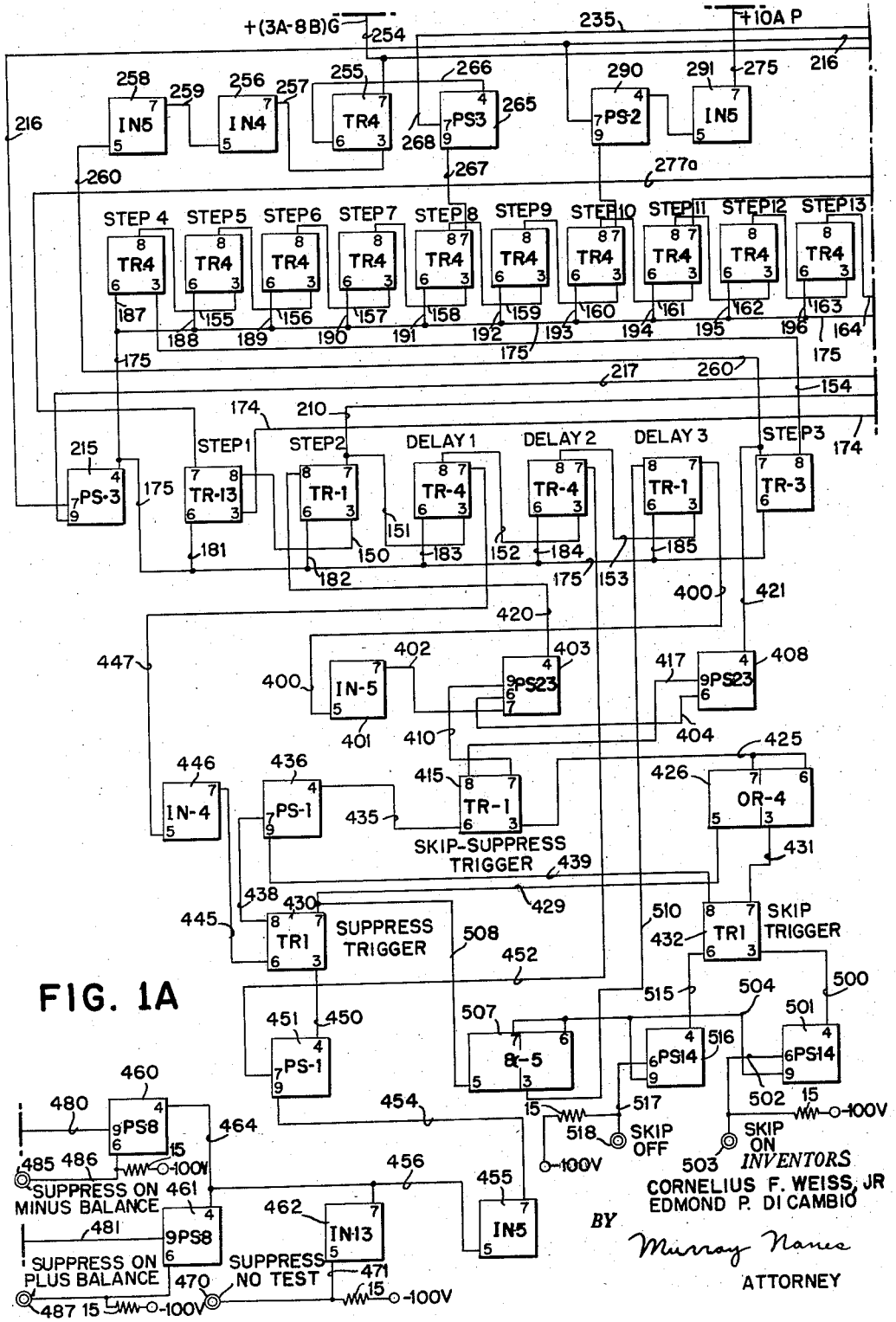

Wherever shown, unless otherwise indicated in the drawings the values for the various resistors and condensers are in thousands of ohms and micromicrofarads, respectively. For example, a resistor labeled 200 indicates a 200K (200,000) ohm resistor; a condenser labeled 100 indicates a 100 micromicrofarad condenser.

The terms "positive" and "negative" potentials used in the discussion of the circuits refer to relative values, rather than values with respect to ground.

The novel skip and suppress circuit is embodied in the programming portion of a calculator but it is to be expressly understood that the use of these novel means as part of a programming device and in conjunction with a calculator is illustrative only in order to clearly point out the precise operation of the invention.

Figure 1B:
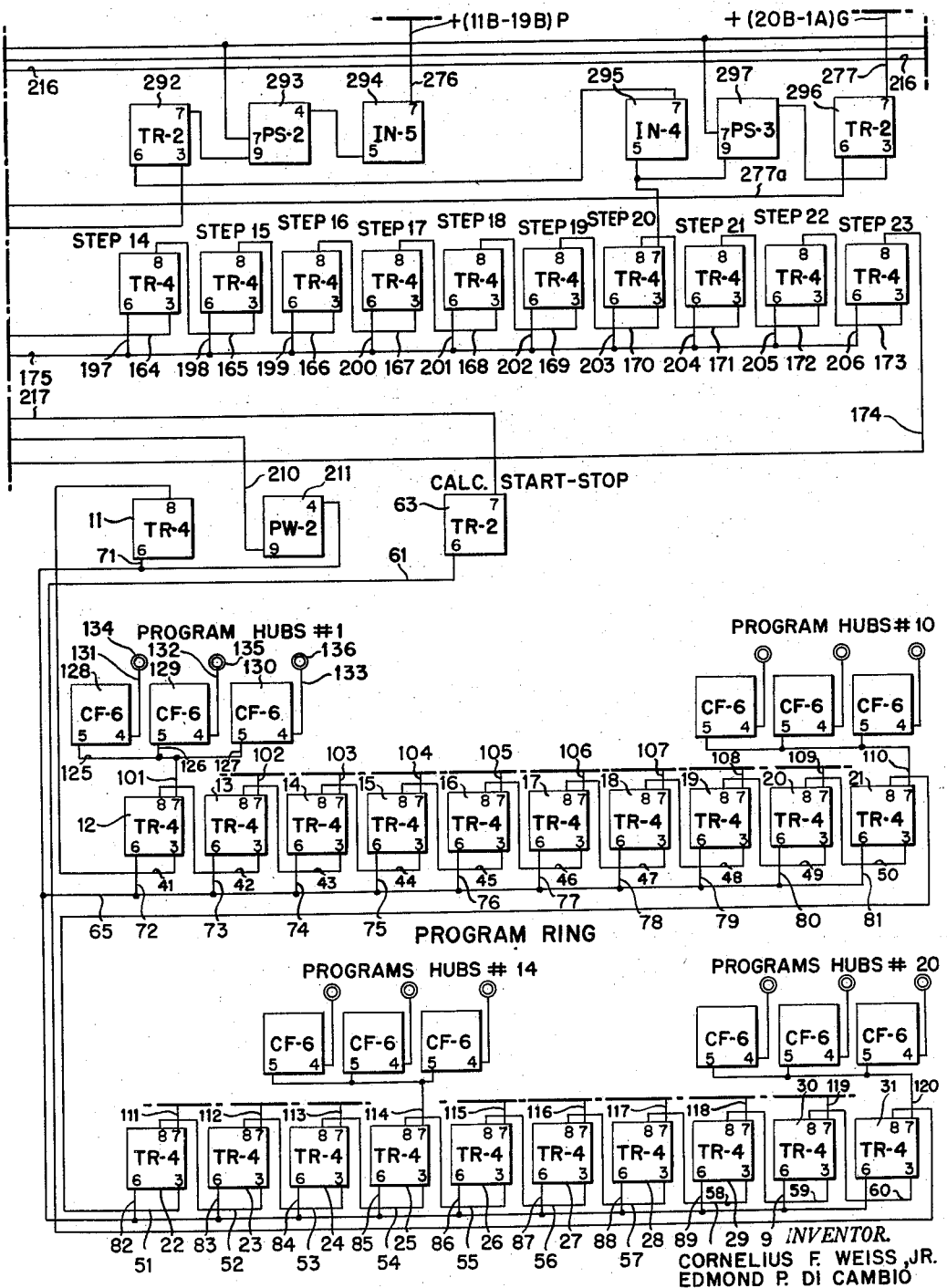
Figure 1C:
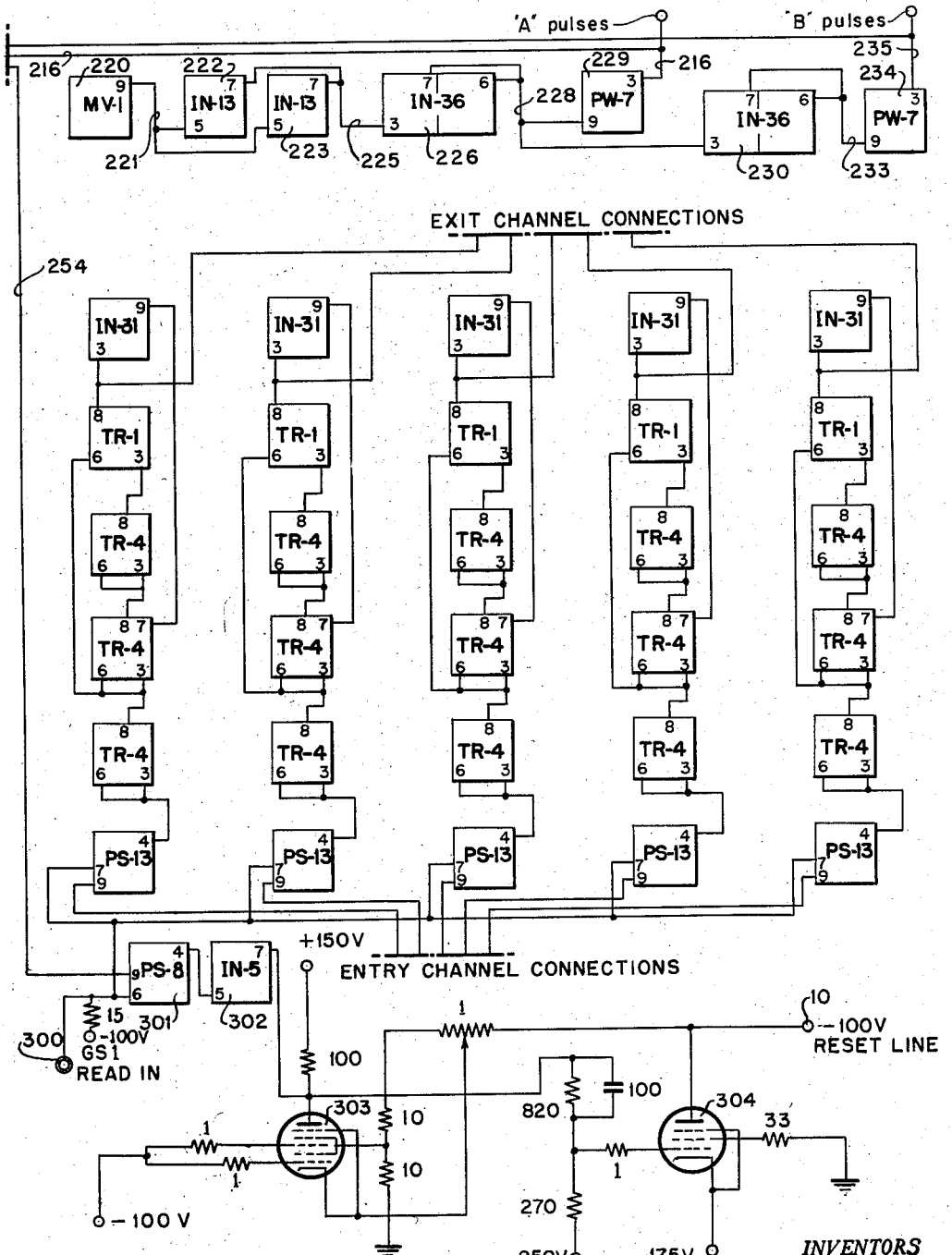

Referring generally to Figs. 1A, 1B and 1C of the drawings it will be seen that the different elements comprising the invention are represented by blocks, whose contents are illustrated in other figures of the drawings, the inputs and outputs only being indicated in Figs. 1A, 1B and 1C. Before proceeding with a description of the program circuit and its novel associated skip and suppress circuit, a detailed description of the respective elements such as the multivibrator, cathode followers, power tubes, triggers, inverters, pentagrid switches, And circuits and Or circuits, will be given. The contents of the respective blocks and the respective block representations are shown in Figs. 3 to 28.

Multivibrator

Figure 3:
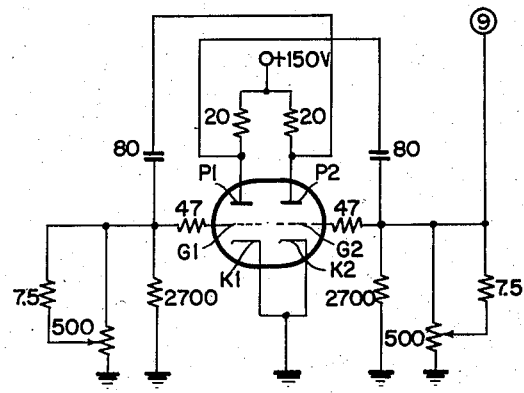
Fig. 3 is a detailed circuit diagram of a multivibrator employed in the invention and its corresponding simplified block representation.

In Fig. 3, there is shown a type of multivibrator whose block symbol is labeled MV–1. This multivibrator comprises, for example, a type 6J6 dual triode tube comprising two triodes in one envelope. Two such triodes with normally conducting grids, when retroactively capacity coupled will oscillate in a manner now well known in the art. This device is called a multivibrator and in the present invention is used as the parent source of square pulses supplied to the calculator.

Referring to Fig. 3, plate P1 of the left hand triode is coupled via an 80 micromicrofarad condenser, in series with a 47K ohm resistor to a grid G2 of the right hand triode. Connected between ground and the junction of this condenser and resistor are a 500K ohm potentiometer, in parallel with a 2700K ohm resistor. A 7.5K ohm resistor is connected between the same junction and a tap on the 500K ohm potentiometer. Plate P1 of the left hand triode is connected via a 20K ohm resistor to a +150 volt source while plate P2 of the right hand triode is connected to the same +150 volt source through another 20K ohm resistor. Cathodes K1 and K2 are commonly connected to ground. Plate P2 is coupled to grid G1 by an 80 micromicrofarad condenser in series with a 47K ohm resistor. Connected between ground and the junction of this condenser and resistor are a 500K ohm potentiometer, in parallel with a 2700K ohm resistor. A 7.5K ohm resistor is connected between this latter junction and a tap on the 500K ohm potentiometer. The frequency of the multivibrator can be set to 50 kc. by varying the taps on the two 500K ohm potentiometers and the square wave output is taken from output "terminal 9" which is connected as shown.

Triggers

Referring to Figs. 7 to 11, inclusive, the details of several electronic triggers are shown, designated respectively TR–1 through TR–4 and TR–13 which are commonly known in the art as the Eccles-Jordan type trigger. These each comprise two cross-coupled triodes (which may be included in one envelope, such as, for example, a type 6J6 tube) in which a plate P1 of a left hand triode is coupled by means of a 200K resistor in series with a 1K resistor to the grid G2 of a right hand triode and plate P2 of a right hand triode is likewise coupled to the grid G1 of the left hand triode by a 200K ohm resistor in series with a 1K ohm resistor, each of these 200K resistors being shunted by a 100 micromicrofarad condenser, as shown. Grid G1 is connected via the 1K resistor, in series with a 200K resistor, to a terminal "5" and through the same 1K resistor, in series with a 40 micromicrofarad condenser, to an input terminal "6." Grid G2 is connected by identical circuitry to a terminal "4" and to an input terminal "3." Plates P1 and P2 of the triggers TR–1 through TR–4 respectively, are similarly connected to a +150 volt power supply via pairs of 12K and 7.5K ohm resistors in series, as shown. Plate P2 of TR–13 (Fig. 11) is connected to such a +150 volt power supply via a 12K and a 7.5K ohm resistor, in series, but its plate P1 has two 10K ohm resistors so connected in series to the +150 volt power supply. The cathodes K1 and K2 of all the triggers are grounded, as shown.

Trigger TR–2 has a 10 micromicrofarad condenser connected between the input circuits, as shown, in order to obtain more stabilized operation; the condenser tending to prevent operation by transient pulses.

The triggers differ from each other mainly in the specific connections of the output terminals. In triggers TR–1 and TR–2, (Figs. 7 and 8, respectively) a terminal "8" is directly connected to P1 while a terminal "7" is directly connected to P2, as shown. In trigger TR–3 (Fig. 9) a terminal "7" is connected to P1 and a terminal "8" is connected to the tap between the plate resistors of P2. In trigger TR–4, (Fig. 10) a terminal "7" is directly connected to P2 and a terminal "8" is connected to the tap between the 7.5K ohm resistor and the 12K ohm resistor of P2. In trigger TR–13, (Fig. 11) a terminal "7" is connected via a 4.7K resistor to the tap between the respective 10K ohm resistors. A terminal "8" of trigger TR–13 is connected to the tap between the 7.5K and the 12K ohm resistors of P2.

As is now well known in the art, such triggers have two conditions of stability. When the left hand triode of the trigger is conducting, the voltage at plate P1, with the circuit values indicated, is lowered from approximately +140 volts to approximately +40 volts, which, through the coupling previously described, maintains the grid G2 relatively negative, so that the right hand triode is blocked when the left hand triode conducts. Thus when P1 and its corresponding output is negative, P2 and its corresponding output is positive. This comprises one state of stability of the trigger and will hereinafter be designated as the On condition. In a similar manner, if the right hand triode is conducting, the reduction in voltage on the plate P2 is applied by the coupling connection, previously described, to the grid G1, to thus block the left hand triode so that P1 and its corresponding left hand output now become positive and this condition will hereinafter be designated as the Off condition.

If, for example, the irght hand triode is conducting, (trigger Off) a negative voltage applied to its grid G2 via input terminal 3, will flip the trigger On, by blocking the right hand triode and thus rendering the left hand side conductive. Likewise, if the left hand triode is conducting, (trigger On) a negative voltage applied to its grid G1, via input terminal 6, blocks the left hand side of the tube thus flipping the trigger Off. The above two methods are normally used for flipping the triggers On and Off.

Another method known as "plate pullover" may be employed to flip a trigger On. This consists of applying a —100 volt pulse, directly to the plate P1 of a trigger. Since plate P1 is coupled to grid G2, this acts to apply a negative pulse to G2 and thus render the right hand triode non-conducting thus flipping the trigger On.

In the operation of the invention, it is required that some of the triggers be reset On and others reset Off, before the start of an operation. To reset a trigger On, a sufficiently positive voltage is applied to grid G1 to cause the left hand side of the 6J6 tube to conduct. The triggers used are so designed that a positive shift applied to either input terminal "6" or to terminal "3" and through the 40 micromicrofarad condenser to the grids will not flip the triggers. However, by applying a positive voltage conductively through terminal "5" or "4" and through the corresponding resistor to one of the grids, the trigger will be flipped. In triggers which are to be reset On, terminal "4" is connected to a —100 volt negative bias supply, and teminal "5" is connected to a "—100 volt reset" line 10 (Fig. 1C). The "—100 volt reset" line 10 is then shifted from —100 volts to ground potential, (relatively plus) in a manner referred to later, when it is desired to reset the trigger, ground potential being sufficiently positive to thus reset the trigger On by rendering the left hand triode conductive.

In triggers, which are to be reset Off, it is the terminal "4" which is connected to the "—100 volt reset" line 10 while terminal '5" is connected to the —100 volt negative bias supply, so that when the "—100 volt reset" line 10 is shifted to ground potential, the right hand triode is rendered conductive thus resetting the trigger Off.

*Inverters*

Inverter circuits, designated IN-4, IN-5, IN-13, IN-31 and IN-36, respectively, are illustrated, respectively, in Figs. 12 through 16. The function of an inverter is to take a positive voltage supplied to its input terminal and produce a negative voltage at its output terminal. Conversely, negative inputs produce positive outputs.

Each inverter comprises one half of a dual triode type 6J6 tube, except the inverter IN-36 (Fig. 16) which as shown employs both halves of the dual triode illustrated. The cathodes of all the inverters are connected to ground, as shown.

In inverters IN-4 and IN-5 (Figs. 12 and 13, respectively) the grid is connected via a 47K resistor and a 430K ohm resistor to a source of —100 volts and is also connected to an input terminal "5" through the same 47K resistor, in series with a 390K ohm resistor, shunted by a 100 micromicrofarad condenser as shown. The plate is connected to a +150 volt power supply through 12K and 7.5K ohm resistors, in series. IN-4 differs from IN-5 in that the output terminal "7" of IN-4 is connected to the junction of the 7.5K and the 12K ohm resistors while the inverter IN-5 has its output terminal "7" connected directly to the plate.

Inverter IN-13 (Fig. 14) is similar to inverter IN-5, except that its input terminal "5" is connected directly through a 47K resistor to the control grid and no negative bias supply is provided.

Inverter IN-31 (Fig. 15) has an input terminal "3" which is connected to the grid of the triode through a 25 micromicrofarad condenser and a 1K ohm resistor. A —100 volt source is applied to one end of a 510K ohm resistor connected at its other end to a 39K ohm resistor which in turn is connected to ground. The junction of the 510K ohm resistor and the 39K ohm resistor is connected via the above mentioned 1K ohm resistor to the grid of the triode whose plate is connected directly to an output terminal "9."

In inverter IN-36 (Fig. 16) a —100 volt source is connected to one end of a 430K ohm resistor whose other end is connected via a 390K ohm resistor shunted by a 100 micromicrofarad condenser to a terminal 3. The junction of the 430K ohm resistor and the 390K ohm resistor is connected via one 47K ohm resistor to the grid G1 and via another 47K ohm resistor to the grid G2. Plate P1 of the left hand triode is connected directly to an output terminal "7" and is also connected via a 12K ohm and a 7.5K ohm resistor, in series, to a +150 volt supply, while plate P2 of the right hand triode is connected directly to an output terminal "6" and is also connected via a 12K ohm and 7.5K ohm resistor, in series, to the +150 volt supply.

*Pentagrid switches*

Figs. 17 through 25, respectively, illustrate electronic switching circuits and their blocks PS-1, PS-2, PS-3, PS-12, PS-13, PS-8, PS-14, PS-22 and PS-23, respectively. Each electronic switching circuit may employ a pentagrid tube of the 6BE6 type.

Each of these switches requires simultaneously applied positive voltages at the respective input terminals connected to their grids G1 and G2, in order to cause conduction of the respective tube, so that a negative output is produced when and only when, both inputs are positive.

Each pentagrid tube has its cathode grounded, as shown, and its suppressor grid directly connected to the cathode. The screen grid SG of each pentagrid switch is connected via a 0.47K resistor to a source of +75 volts.

The grid G1 of pentagrid switch PS-1 (Fig. 17) is shown as connected by means of a 47K ohm resistor, in series with a 430K resistor, to a voltage source of —100 volts and is also connected through the same 47K ohm resistor, in series with a 390K ohm resistor, shunted by a 100 micromicrofarad condenser, to an input terminal "9." Grid G2 is connected through a 47K ohm resistor, in series with said 430K ohm resistor, to said source of —100 volts and is also connected through the same 47K resistor, in series with said 390K resistor, shunted by a 100 micromicrofarad condenser, to an input terminal "7." The plate of switch PS-1 is connected through 12K and 7.5K ohm resistors, in series, to a +150 volt supply. An output terminal "4" is connected to the junction of the 7.5K ohm and 12K ohm resistors.

Switch PS-2 (Fig. 18) is exactly like the switch PS-1, except that its output terminal "4" is connected directly to the plate.

Switch PS-3 (Fig. 19) is also exactly like switch PS-1, except that it has two 10K ohm resistors, in series, connecting its plate to the +150 volt supply and its output terminal "4" connected to the junction of the two 10K ohm resistors.

Switch PS-12 (Fig. 20) has its plate connected through two 10K ohm resistors to a +150 volt supply and an output terminal "4" connected directly to the plate. Grid G1 of switch PS-12 is connected through a 47K ohm resistor to an input terminal "9" and said grid G1 is also connected through the same 47K ohm resistor and a 15K ohm resistor, in series, to a —100 volt negative bias supply. Grid G2 is connected through a 47K ohm resistor, to an input terminal "7."

Switch PS-13 (Fig. 21) is similar to switch PS-12, except that its output terminal "4" is connected between the two 10K ohm resistors instead of directly to the plate, and there is no —100 volt source connected via a 15K ohm resistor to the grid G1, which grid is connected only through a 4.7K ohm resistor to an input terminal "9."

Switches PS-8, PS-14, PS-22 and PS-23 of Figs. 22, 23, 24 and 25, respectively, each has its plate connected through two 10K ohm resistors, in series, to +150 volt supply. The output terminal "4" of switch PS-14 (Fig. 23) is a tapped output connected between the two 10K ohm plate resistors. The other three pentagrid switches PS-8 (Fig. 22), PS-22 (Fig. 24) and PS-23 (Fig. 25) have their output terminals "4" respectively connected, directly to their respective plates.

Grid G1 of the switch PS-8 (Fig. 22) is connected, through a 47K ohm resistor to an input terminal "6." Grid G2 is connected through a 47K ohm resistor in series with a 430K ohm resistor, to a —100 volt bias supply. Grid G2 is also connected through the same 47K ohm resistor and a 390K ohm resistor, shunted by a 100 micromicrofarad condenser to an input terminal "9."

Grid G1 of switch PS-14 (Fig. 23) is connected through a 4.7K ohm resistor, in series with a 430K ohm resistor, to a source of —100 volts and is also connected through the same 4.7K ohm resistor, in series with a 390K ohm resistor shunted by a 40 micromicrofarad condenser to an input terminal "9." Grid G2 is connected through a 47K ohm resistor to an input terminal "6."

Grid G1 of the switch PS-22 (Fig. 24) is connected through a 4.7K ohm resistor to an input terminal "9" and from there, through a 40 micromicrofarad condenser to an input terminal "7." Grid G1 is connected to ground via a 200K ohm resistor and is negatively biased, through the above-mentioned 4.7K ohm resistor connected in series with a 1000K ohm resistor to a source of —100 volts. Grid G2 is connected through a 47K ohm resistor to an input terminal "6."

The grid G1 of switch PS-23 (Fig. 25) is connected by way of a 47K ohm resistor, in series with a 390K resistor, shunted by a 100 micromicrofarad condenser, to an input terminal "9," and this grid G1 is also connected, by the same 47K ohm resistor, in series with a 430K ohm resistor, to a source of —100 volts. Grid G2 is connected, through a 100K ohm resistor, to an input terminal "6" and from there through a 22 micromicrofarad condenser to an input terminal "7." Grid G2 is negatively biased through the same 100K ohm resistor connected in series with a 1000K ohm resistor connected to a source of —100 volts and is also connected via said 100K resistor in series with a 200K ohm resistor connected to ground, as shown.

Cathode follower

Figure 4:
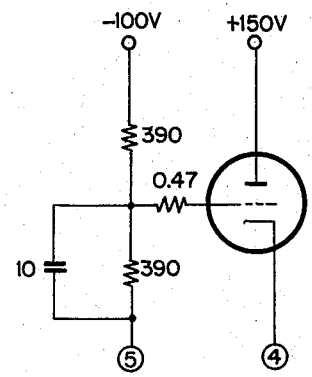
Fig. 4 is a detailed circuit diagram and corresponding block representation of a cathode follower employed in the invention.

Referring to Fig. 4, there is illustrated therein, a type of cathode follower whose block symbol is labeled CF-6, which comprises a single triode which may actually be one of the triodes only, of a dual triode 12AV7 type tube. A cathode follower may be defined as a vacuum tube circuit in which the input signal is applied between the control grid and ground, but the output, instead of being taken from the plate, is taken from between the cathode and the cathode load circuit which may comprise a resistor in another circuit, for example. The cathode follower has a high input impedance, but a low output-input impedance and is capable of producing a power gain, without a voltage inversion. The grid of the triode (Fig. 4) is connected through a 0.47K ohm resistor, in series with a 390K resistor, to a negative bias supply of —100 volts and is also connected through the same 0.47K resistor, in series with another 390K resistor, shunted by a 10 micromicrofarad condenser, to an input terminal "5." The plate is directly connected to a +150 volt power supply and the cathode, as shown, is connected to an output terminal labeled "4."

Power tubes

Figures 5, 6:
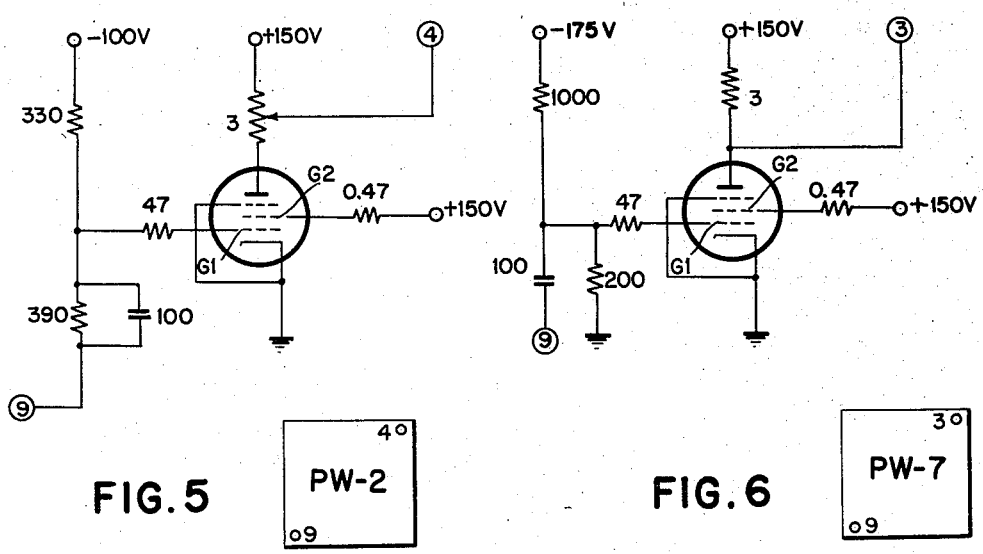
Figs. 5 and 6 are detailed circuit diagrams and the respective block representations of power tubes employed in the invention.

Referring to Figs. 5 and 6, power tube circuits are illustrated therein, designated as PW-2 and PW-7, respectively. A power tube is one which is capable of producing a power gain from an input signal with, howovere, a voltage inversion. The circuits shown in Figs. 5 and 6 include a pentode, which may be of the 6AQ5 type, with a grounded cathode, and a suppressor grid directly connected to the cathode. The grid G2 is connected, through a 0.47K resistor, to a source of +150 volts. The plate is connected to a +150 volts power supply, through a 3K ohm resistor. Power tube PW-2 (Fig. 5) has an output terminal "4" connected to a tap on said 3K resistor. The grid G1 is connected through a 47K resistor, in series with a 330K resistor, to a—100 volt negative bias supply. Grid G1 is connected, through the same 47K resistor, in series with a 390K ohm resistor, shunted by a 100 micromicrofarad condenser, to an input terminal "9."

Grid G1 of power tube PW-7 (Fig. 6) is connected through a 47K ohm resistor, in series with a 100 micromicrofarad condenser, to an input terminal " 9." Grid G1 receives its negative bias through the same 47K resistor connected to a divider network comprising a 200K resistor connected to ground, as shown and a 1000K resistor connected to a source of —175 volts.

"And" and "Or" circuits

Figure 26:
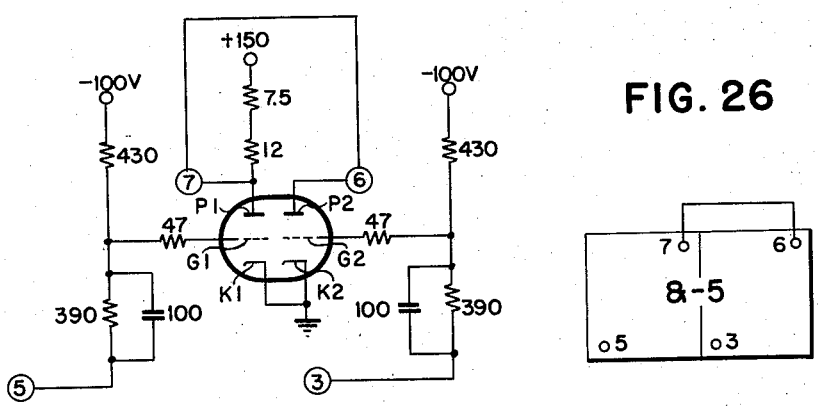
Fig. 26 is a detailed circuit diagram and the corresponding block representation of an "And" circuit employed in the invention.
Figure 27:
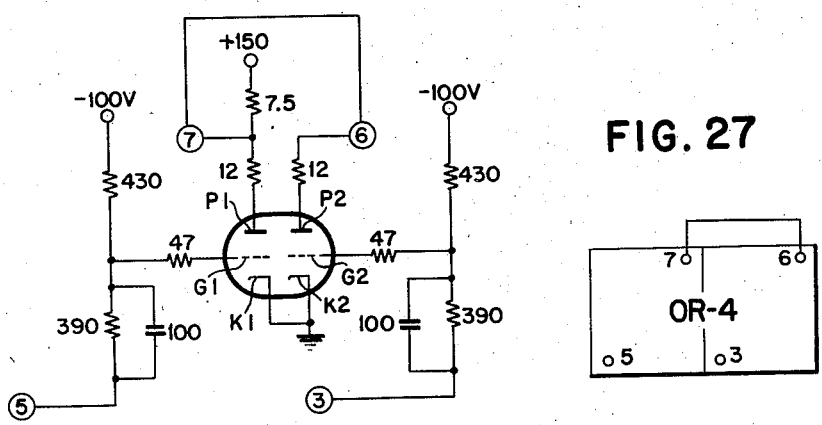
Fig. 27 is a detailed circuit diagram and the corresponding block representation of an "Or" circuit employed in the invention.

When the plates of two inverters, which are negatively biased beyond cutoff, have a common plate resistor, the combined circuit, by using two separate inputs, can be either an "And" or an "Or" circuit, respectively, as shown in Figs. 26 and 27. The value of the plate resistors are chosen so that the inverter tubes are operated on the portion of their characteristic curve where most of the voltage drop is across the load resistor and where changes in voltage at the plate are very slight, with a change in plate current. This means that the voltage at the commonly connected plates of Fig. 26 are essentially the same, and negative, whether one inverter tube is conducting or both are conducting. Only when neither inverter is conducting do the commonly connected plates go positive.

A so-called negative "And" circuit makes use of this effect by keeping the two inverters normally conducting and applying positive voltages to the two inputs. Then in order to get a positive output, both inputs must go negative. The "Or" circuit makes use of this effect by keeping the two inverters, normally cut off, and by applying negative voltages to the two inputs. Then in order to get a negative output, either or both inputs must go positive.

Basically, an "And" circuit acts like a pentagrid switch, in that it requires a coincidence of two inputs to obtain one output. The negative "And" circuit, differs from the pentagrid switch, in that it acts to produce a positive output signal, only upon a coincidence of two negative inputs, while the pentagrid switch acts, as previously described, to effect a negative output signal, only upon a coincidence of two positive inputs.

The "And" circuit disclosed in Fig. 26 has its block insignia labeled "&-5" and comprises the two triodes of a dual triode 6J6 type tube. The left hand triode comprises a type IN-5 inverter (Fig. 13). The right hand triode is similar to a type IN-5 inverter except that its input terminal is labeled "3" and its output terminal "6" and it has no plate resistors. Output terminal "7" (Fig. 26) is conductively connected to output terminal "6," as shown.

The "Or" circuit of Fig. 27 has its block insignia labeled OR-4 and comprises the two triodes of dual triode 6J6 type tube. The left hand triode comprises a type IN-4 inverter (Fig. 12). The right hand triode (Fig. 27) is similar to a type IN-4 inverter except that its input terminal is labeled "3," and it is supplied with only one plate resistor of 12K ohms which is between the plate P2 and the output terminal labeled "6." The two output terminals 6 and 7 are conductively connected together, as shown.

Figure 28:
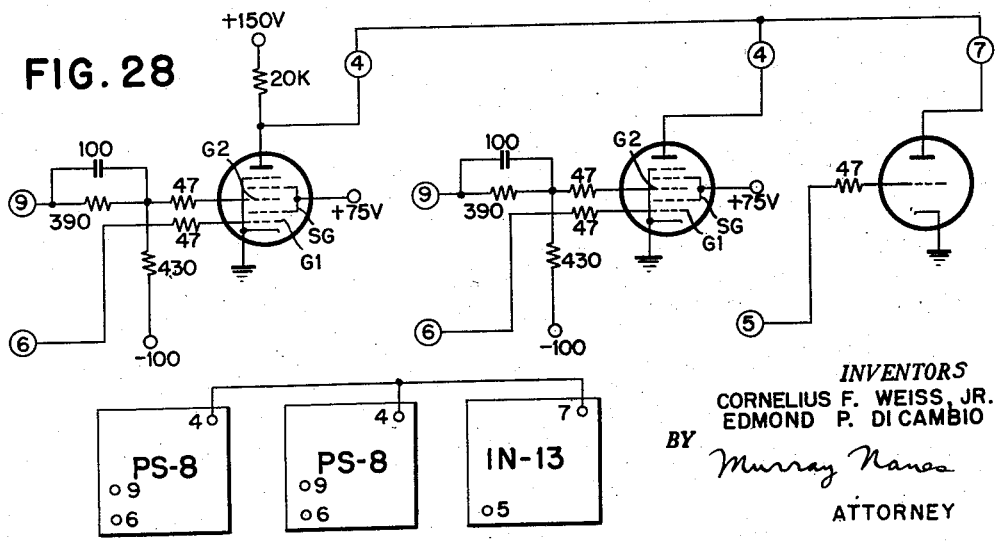
Fig. 28 is a detailed circuit diagram and the corresponding block representation of a modified "Or" circuit employed in the invention.

Another circuit employed in the invention is shown in Fig. 28. This comprises two type PS-8 switches (Fig. 22) and one type IN-13 inverter (Fig. 14) without plate resistors, the respective plates being conductively connected, as shown, Fig. 28 and connected via a common 20K ohm plate resistor to a +150 volt source. Because of the common 20K ohm plate resistor, this circuit acts similar to an "Or" circuit. If the inverter is actuated by a positive input, or either of the switches are actuated by two positive inputs, a negative output will result.

While specific tube types and values of resistors and condensers have been defined in connection with the multivibrator, cathode follower, power tubes, triggers, inverters, and switches, these are to be taken as exemplary only and the tube type and values may be varied in accordance with the knowledge of those skilled in the art, without departing from the spirit of the invention.

Electronic calculator

Before proceeding to the operation of the novel skip and suppress circuit, per se, it is believed that a brief description of an electronic calculator which utilizes this invention as a part thereof, will highlight the operation of the skip and suppress circuit. Basically, the calculator used is the one fully described in the patent to R. L. Palmer et al., 2,658,681, issued November 10, 1953, with certain changes in its primary timer ring to adapt it for direct incorporation of this invention into the calculator, along with certain other minor changes described specifically later.

Figure 2:
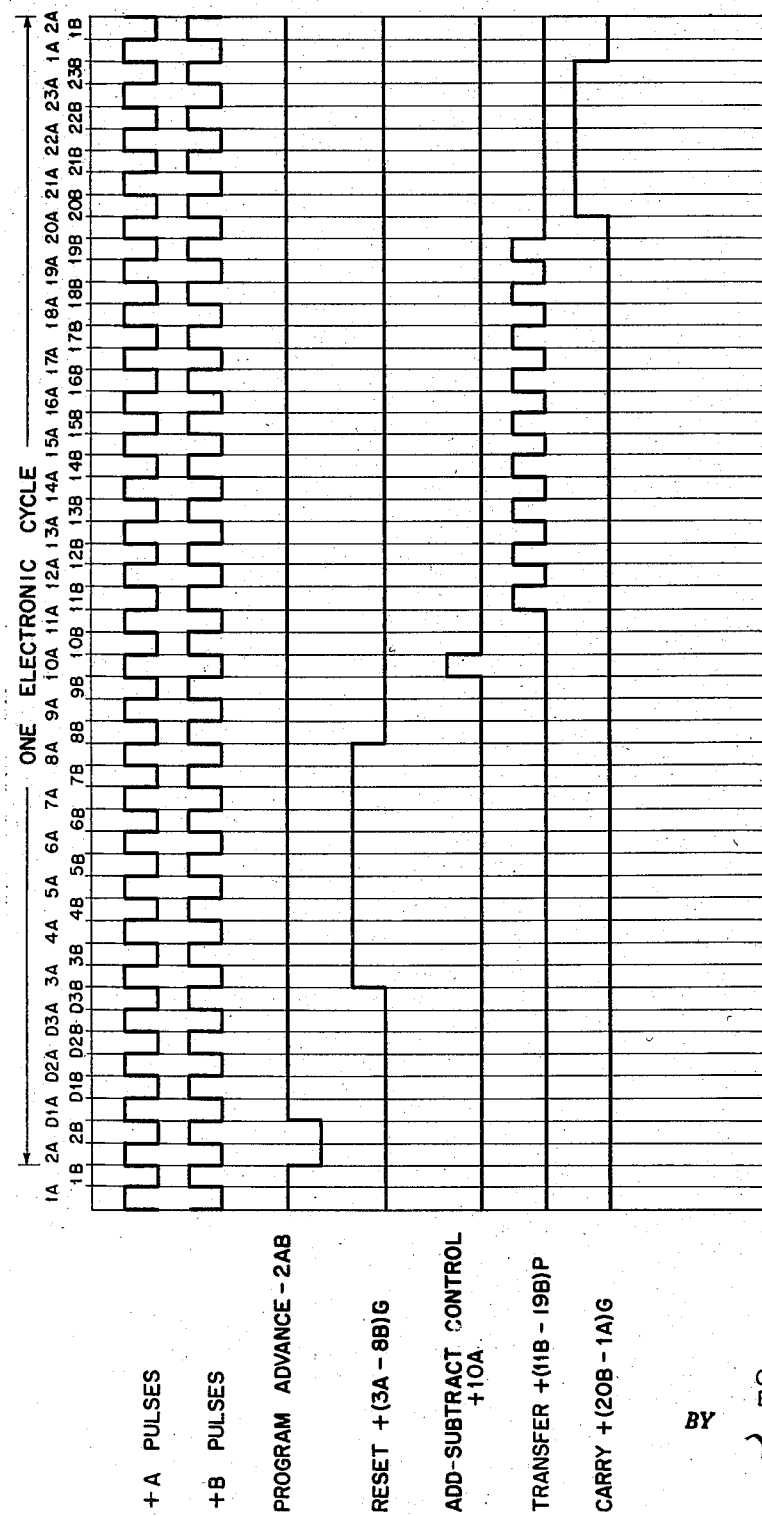
Fig. 2 is a timing chart illustrating primary timer pulses and the timing of machine function pulses.

The source of basic operating pulses for said calculator comprises a multivibrator, to be described presently, which supplies a series of so-called "A" pulses which are produced at the rate of 50 kc., and a series of so-called "B" pulses, which are produced at the same rate, but 180° out of phase with the "A" pulses, these being illustrated diagrammatically in Fig. 2. These pulses drive a primary timer circuit, which comprises series of triggers cascade connected in a "ring circuit," and so operated that only one trigger will be On at any one time, and all the others will be Off. The ring is reset so that the first trigger of the ring is On and all the other triggers are Off. When successive "A" pulses are applied to the ring, the respective triggers are switched On, in succession, each preceding trigger being switched Off as the succeeding one is switched On.

The primary timer, which in the Palmer et al. application previously mentioned, is a ring of 23 such triggers, now requires an additional three triggers which will hereinafter be called delay triggers. The primary timer ring has outputs from the various triggers which comprise pulses (or voltage conditions) at certain times in the primary cycle. These are used for controlling gating circuits which are thereby permitted to transmit a definite number of "A" or "B" pulses, to a circuit element, or to operate a device directly.

The electronic calculator circuits comprise electronic counters, each consisting of a group of four cascade connected triggers interconnected to produce certain feed backs, whereby the normal binary cascade operation is altered to decade operation, as shown basically in the patent to B. E. Phelps 2,584,811 issued February 5, 1952.

Several such counters each including carry means, comprise a multi-ordered electronic accumulator. There may be any desirable number of counters in the accumulator, the accumulator of said Palmer et al. patent comprising 13 orders. The calculations, per se, take place in the accumulator.

Storage devices are also provided which comprise similar electronic counters sans carry means, such as a GS1 storage device, referred to particularly herein presently.

The main purpose of the electronic calculator of said Palmer et al. patent is to perform a series of repetitive calculations, starting with factors punched, in successive record cards, with the various steps under control of manually plugged wiring. This calculator is employed for all types of calculations including addition, subtraction, multiplication and division, and series of calculations comprising various combinations of these specific types of calculation. To perform these various operations, transfer of factors between the storage devices and the accumulator must be performed. A program ring of 20 steps is disclosed herein to supply, to exit hubs, a series of output voltages, one step at a time, to be used in selecting the order of the functions to be performed by the calculator. Obviously any desired number of exit hubs may be so employed.

The exit hubs which are connected by external plugging to selected function control hubs, are activated by the program ring, while the program ring has its basic timing controlled by the primary timer, so that the program ring steps, from one program step to the next step, at the beginning of each such primary timer cycle. If other controls to be described presently, were not provided, the program exit hubs would be made active, in succession, with the program steps, from one to the next, occurring at the beginning of each primary timer cycle.

Program ring

Basically, the program ring comprises a ring of electronic triggers, each comprising a step and each comprising a pair of cross-coupled triodes (of the type generally as shown in the Overbeck Patent 2,404,918). The program ring illustrated in instant application and described presently consists of 20 program steps (although any number of steps can be used) only one step being On, at any partcular time. Upon simultaneous application of a pulse to each of the triggers of the ring, as described in said Overbeck Patent, the stage that is On goes Off and in going Off flips the next stage On. With each incoming pulse, the ring advances one step. The program ring differs slightly from that shown in said Overbeck patent, in that it is, what is commonly referred to as an "open" electronic ring, that is, one that shuts itself off, at its end, rather than starting over again.

Figures 9, 10:
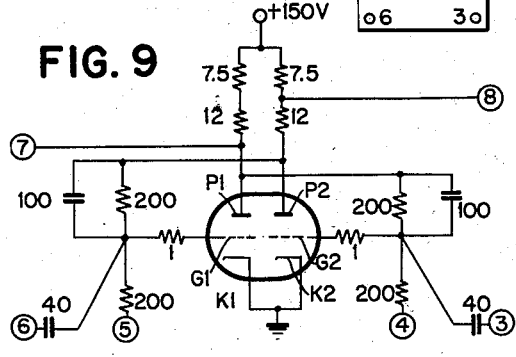
Figure 11:
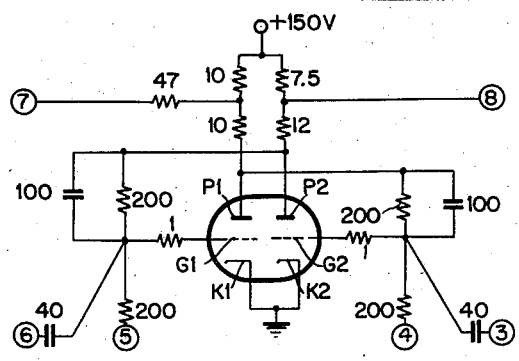
Figure 17:
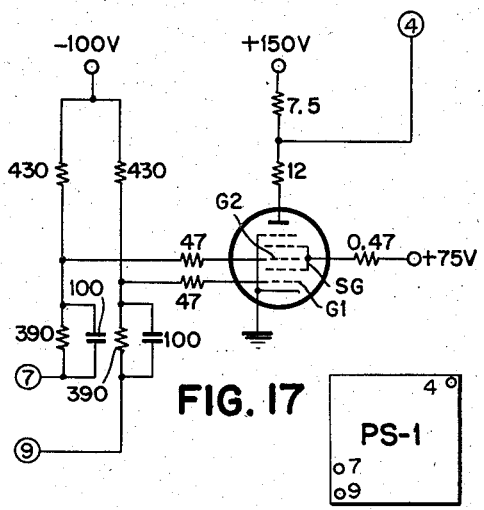
Figs. 17 to 25 are detailed circuit diagrams and the block representations of electronic pentagrid switching circuits employed in the invention.
Figure 18:
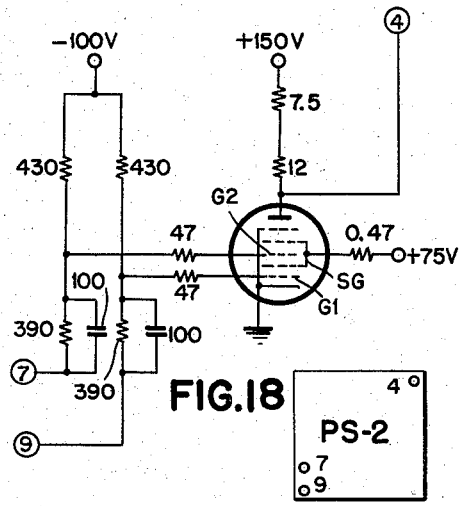
Figure 19:
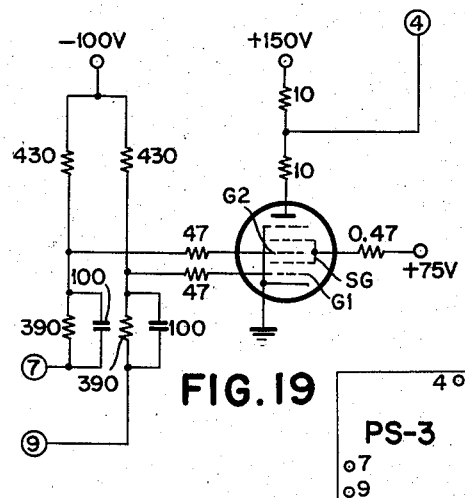
Figure 20:
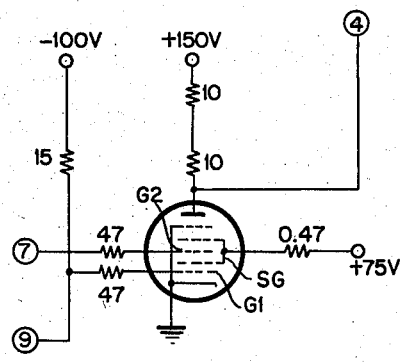
Figure 21:
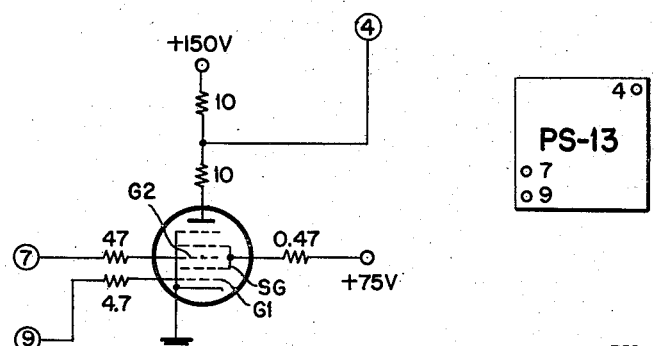
Figure 22:
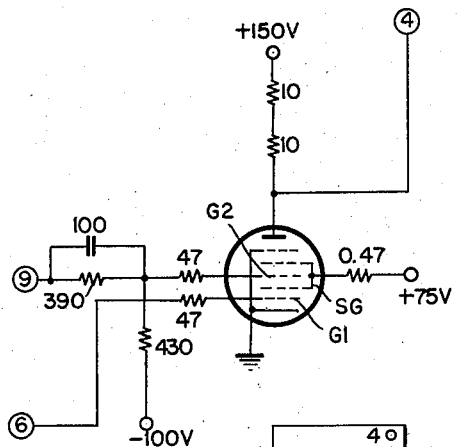
Figure 23:
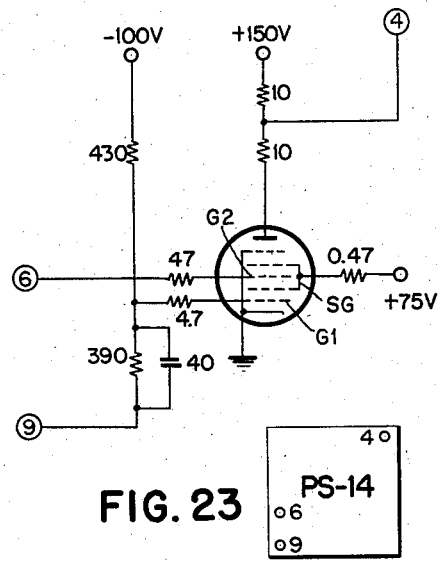
Figure 24:
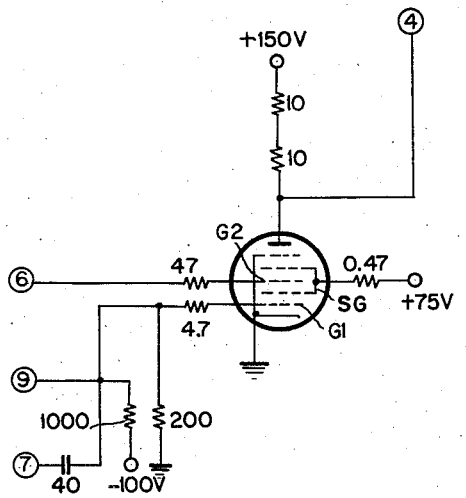

The program ring includes a home position trigger 11 (Fig. 1B) and twenty triggers 12 to 31, inclusive. All the triggers are of type TR-4 (Fig. 10). Trigger 11 is of the type that is reset On, before the start of calculation, while all the others are initially reset Off. Leads 41 to 60, respectively, (Fig. 1B) connect the tapped output terminals "8" (see also Fig. 10) of each of the triggers to the respective right hand input of the succeeding trigger stage, while lead 61 connects output terminal "8" of the last program trigger 31, to the left hand input of trigger 63, which is a type TR-2 (Fig. 8) and which is called the Calculate Start-Stop trigger. An input lead 65, supplying negative pulses from the primary timer (in a manner to be later described) is connected through leads 71 to 91, inclusive, to each of the respective left hand inputs of triggers 11 to 31, inclusive.

The first negative input pulse on line 65 acts via line 71 to turn off the home position trigger 11, which as stated, has been initially reset On, but this pulse does not affect any of the other triggers since they have all been reset Off. When trigger 11 goes Off, its plate P–2 (Fig. 10) goes negative, as previously described, and this negative swing is applied from its output terminal "8" via line 41 to the input terminal "3" of trigger 12, to thus turn this trigger 12 On. The next pulse on line 65, acts via line 72 to turn Off trigger 12 which thus turns trigger 13 On. This stepping process continues, until the last trigger 31 goes Off, which, via line 61, and the terminal "6" of the Calculate Start-Stop trigger 63, turns it Off, thereby ending the program.

Leads 101 to 120, inclusive, respectively connect the output terminals "7" of each of the triggers 12 to 31, inclusive, to inputs of cathode followers. Home position trigger 11 is not connected to a cathode follower because no calculation is desired while the home position trigger 11 is On. In Fig. 1B, only the cathode followers which are connected to triggers 12, 21, 25, and 31, are shown, but it is to be understood that there are cathode followers connected to each of the triggers of the program ring. Lead 101 is connected to leads 125, 126 and 127, which are connected, respectively, to the inputs of cathode followers 128, 129 and 130, which are of the type CF–6 (Fig. 4). The output of the respective cathode followers are leads 131, 132 and 133, which are connected respectively, to the program exit hubs #1 labeled 134, 135 and 136, respectively. Three such program exit hubs are provided for each and every program step.

The types of functions which can be activated by the program exit hubs in the calculator, as described in said Palmer et al. patent are Storage Read-in, Storage Read-out, Counter Read-in, Plus, Counter Read-in, Minus, Counter Read-out, Counter Read-out and Reset, Multiply, Divide and Balance Test.

In this list of the functions, the reference to "Counter" is intended in the art to refer to an accumulator operation.

The novel means of the present invention also contemplate an improved "Suppress" function and a new function to be known as "Skip" which will be described in detail presently.

*Primary timer*

Figure 7:
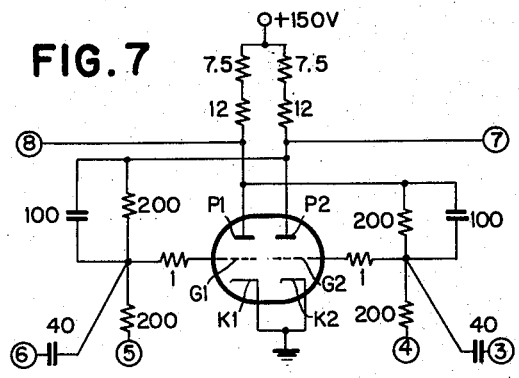
Figs. 7, 8, 9, 10 and 11 are detailed circuit diagrams and the respective block representations of electronic triggers employed in the invention.
Figure 8:
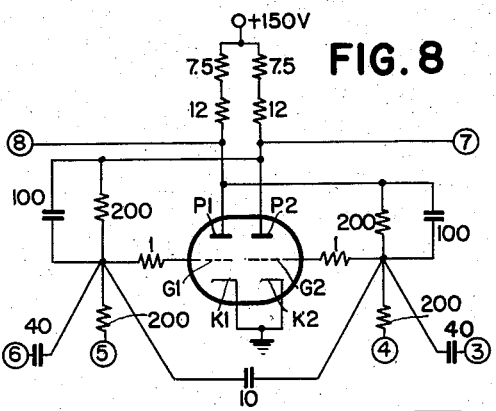

The primary timer ring (Figs. 1A and 1B) comprises twenty-six triggers consecutively arranged in the following order and labeled "step 1," "step 2," "delay 1," "delay 2," "delay 3," "step 3" and "steps 4 to 23," inclusive. Trigger "step 4" to trigger "step 23," and trigger "delay 1" and "delay 2" are of the type TR–4 (Fig. 10). Trigger "step 2" and trigger "delay 3" are of type TR–1 (Fig. 7). Trigger "step 1" is of the type TR–13 (Fig. 11) and "step 3" of the type TR–3 (Fig. 9). Trigger "step 1" is of the type that is reset On while all the others are reset Off. Lead 150 connects the output terminal "8" of trigger "step 1" to the right hand input of trigger "step 2." Leads 150 to 153, inclusive, respectively, connect the right hand output of each of triggers "step 1," "step 2," "delay 1," and "delay 2," inclusive, to the right hand inputs of the respective succeeding trigger. Lead 154 and leads 155 to 173, inclusive, respectively connect the right hand output of each of triggers "step 3" to "step 22," inclusive, to the right hand inputs of the respective succeeding trigger while lead 174 (Fig. 1B) closes the primary timer ring, by connecting the output terminal "8" of the last trigger "step 23" (Fig. 1B) to the right hand input of trigger "step 1" (Fig. 1A). An input lead 175 (Figs. 1A and 1B) supplied with negative pulses, is connected via leads 181 to 206, respectively, to each of the left hand inputs of all the twenty-six primary timer triggers. All the primary timer triggers are advanced in succession because of the interconnecting leads 150 to 174 except that since there is no direct interconnecting lead between trigger "delay 3" and trigger "step 3," trigger "step 3" is not directly turned On by trigger "delay 3." The interconnections between trigger "delay 3" and trigger "step 3" will be described in detail later, in the detailed description of the skip and suppress control network.

When primary timer trigger "step 2," goes On, its terminal "7" goes positive and applies a positive pulse via lead 210 (Figs. 1A and 1B) to a type PW–2 power tube 211. The power tube 211 acts to increase the power output and invert the pulse which becomes a negative input pulse applied via lead 65, to advance the program ring, as described above.

The above mentioned input lead 175 for the primary timer ring, is connected to the output terminal of a PS–3 type switch 215 (Fig. 1A). Its grid 2 input terminal "7" is supplied with positive pulses via lead 216 from a source to be presently described. Grid 1 input terminal "9" of this switch is connected via a lead 217 (Figs. 1A and 1B) to the right hand output terminal "7" of the Calculate Start-Stop trigger 63.

When it is desired to start calculating, this Calculate Start-Stop trigger 63, is reset On by applying a cam produced pulse to input terminal "5" (see Fig. 8) as described in detail in said Palmer et al. patent. The positive voltage which is thus produced at terminal "7" is applied via lead 217 (Figs. 1B and 1A) to condition grid 1 of switch 215 (Fig. 1A) to allow the positive pulses, from lead 216, to pass through switch 215 and start advancing the primary timer ring. As stated above, at the end of the program, the Calculate Start-Stop trigger is turned Off via line 61 (Fig. 1B) which thus produces minus at terminal "7," which is applied via lead 217 to the grid 1 of switch 215 to thereby block the positive pulses from lead 216 passing through switch 215 and the primary ring is stopped. Prior to initiation of another calculation, the primary ring is reset, as described above.

*A and B pulses*

The source of high speed pulses used throughout the calculator and particularly for advancing the primary timer ring will now be described. A multivibrator of the MV–1 type (Fig. 3) and labeled 220 (Fig. 1C) is provided as the source of these pulses. This multivibrator, as previously stated produces approximately square topped pulses at its output terminal "9." Since this output of the multivibrator is not a true square wave, means are provided to shape the pulses into a square wave. This is done by means of triode clippers, which utilize only a portion of the waveform from the multivibrator to produce perfect square waves, all in a manner described in the above identified Palmer et al. patent.

For the proper operation of the calculator, it is necessary to have two pulse sources, displaced in time from each other. As stated above, these two trains of pulses are called "A" pulses and "B" pulses. Fig. 1C illustrates the necessary circuits for generating these "A" and "B" pulses. The operation is as follows:

The output terminal "9" of multivibrator 220 (Fig. 1C) is connected, in parallel, via a lead 221, to two IN–13 type inverters 222 and 223, respectively having commonly connected input and output terminals. This parallel connection of inverters is known as the first clipper. The output of the first clipper is fed, via lead 225, to a second clipper, which comprises a type IN–36 inverter 226 (see also Fig. 16). The commonly connected outputs of this second clipper 226 is connected, via lead 228, to both a PW–7 type power tube 229 (see also Fig. 6) and to another IN–36 type, third clipper, 230. The commonly connected outputs of this third clipper 230 are connected, via a lead 233, to another PW–7 type power tube 234.

The input to the first clipper 222 and 223 is supplied by the output of the multivibrator 220 and each time a negative pulse appears at the input of the first clipper 222 and 223, a negative pulse also appears at the output of the second clipper 226 and a positive pulse appears at the output of the third clipper 230, and obviously, the reverse is also true.

Both the second and third clippers are capacitively coupled (see Fig. 6) to the normally conducting power tubes 229 and 234. Since such normally conducting tubes will recognize only negative pulses, the first power tube 229 will produce a positive output pulse only when the output of the clipper 226 goes negative, and the power tube 234 will produce a positive output pulse only when the output of the clipper 230 goes negative. The pulses produced by the first power tube at least 216, are known as "A" pulses, while the pulses produced by the second power tube at a lead 235 are known as "B" pulses. It is thus apparent that each time the input to the first clipper 222 and 223 goes negative, an "A" pulse is produced and that likewise each time the first clipper 222 and 223 input goes positive, a "B" pulse is produced. The timing of these "A" and "B" pulses is shown in Fig. 2. At 50KC operation, the "A" pulses (or "B" pulses) occur at 20 microseconds intervals and each pulse is of 10 microseconds duration. It is apparent then, that any train of pulses, the "A" pulses always occur first, and the "B" pulses always occur next.

Pulse notation and primary cycle

As has been previously described, the home position of the primary timer ring is "step 1" (Fig. 1A) while the last position is "step 23" (Fig. 1B). Each time the primary timer advances, from "step 23" back to "step 1," one cycle of operation is completed. Thus, including the three delay steps, a group of 26 successive pulses constitutes one electronic cycle, known as the primary cycle. Each such cycle of the calculator can thus be considered to be divided into 26 cycle points. Thus, when the primary timer is reset to normal, the calculator is at "1." When trigger "delay 2" is On, the calculator is at D2, and when trigger "step 12" is On, the calculator is at 12, etc.

In order to simplify electronic timing terminology, a reference notation has been set up which uses the sulffixes "A" and "B." As previously described, "A" pulses are always produced first at the input of the first clipper 222 and 223 (Fig. 1C), and "B" pulses are always produced next. Therefore, as can be seen in Fig. 2, between successive "A" pulses, there is always a "B" pulse.

Since the primary timer is advanced by "A" pulses, each step may be suffixed by the letter "A," to refer to a particular cycle point. Thus, when the primary timer is reset to normal, the calculator is said to be at 1A. Then, as can be seen in Fig. 2, the next "A" pulse advances the timer to 2A, next to D1A, etc. Between 1A and 2A, there is a "B" pulse known as 1B, and between 2A and D1A, there is a pulse 2B etc.

A pulse lasting from the beginning of one "A" pulse to the beginning of the next "A" pulse is called an AB pulse. An AB pulse, therefore, includes both an A pulse and a B pulse. Since the primary timer advances on successive "A" pulses, any one step will be On, from the receipt of one "A" pulse until the receipt of the next "A" pulse. Consequently, the primary timer advances in AB steps and the primary timer ring triggers produce AB pulses. The On sides of the ring triggers produce −AB pulses, while the Off sides produce +AB pulses. All pulse notations are preceded by a plus or minus sign to indicate whether the pulse is a positive pulse or a negative pulse.

The term "gate" is used to signify a duration, from one cycle point to another. A positive pulse, lasting from 3A to 8B is abbreviated +(3A—8B)G. A train of pulses is suffixed by the letter P rather than G. Thus a series of +B pulses occurring between 11B and 19B is abbreviated +(11B—19B)P.

Primary timer controlled pulses

Various gating pulses and trains of pulses are developed under control of the primary timer as is described in detail in said above mentioned Palmer et al. patent. Briefly, the more pertinent ones will be summarized here.

As stated above, when primary timer trigger "stey 2" is turned On, a positive pulse is transmitted via lead 210 (Fig. 1A) to power tube 211 (Fig.1B) where it is inverted and fed via lead 65, to advance the program ring. This pulse from trigger "step 2" is a +2AB pulse while the inverted pulse, which advances the program ring is a −2AB pulse, as shown in the timing diagram, Fig. 2.

A +(3A—8B)G pulse, called a "gate," as stated above, is used in the electronic reset circuit. The circuit for producing this gate is shown in Fig. 1A and comprises a TR-4 type trigger 255 feeding to an output lead 254. This trigger is turned On, at 3A time, and Off at 8B time. A −3AB pulse is fed to the Off side grid of trigger 255 to turn it On, via a lead 257 from an IN-4 type inverter 256 which, in turn, is fed via a lead 259 from a type IN-5 inverter 258. The input to inverter 258 is derived from output pin "7" of primary timer "step 3" via lead 260. The On side, grid of trigger 255 is fed a −8B pulse, to turn it Off, via a PS-3 type switch 265 and lead 266. This −8B pulse is produced by mixing, in switch 265, a +8AB pulse, from the Off side of the primary timer trigger "step 8" via lead 267, and +B pulses, fed to PS-3 via lead 235.

A circuit for developing a +(10A) pulse on lead 275 (Fig. 1A) comprises the "step 10" trigger, switch 290 and inverter 291 on whose output lead 275 the +(10A) pulse is produced as described in said Palmer et al. patent. This +10A pulse is shown in Fig. 2.

A circuit for developing a train of pulses labeled +(11B—19B)P is shown in Figs. 1A and 1B comprising the "step 11" trigger, the trigger 292, switch 293 and inverter 294 on whose output line 276 this pulse is produced under control of the "step 20" trigger, controlled by the "step 19" trigger acting via inverter 295 as described in said above-identified Palmer et al. patent, while a "gate" +(20B—1A)G is produced on the output line 277 of a trigger 296 (Fig. 1B) under control of the "step 1" trigger, line 277a, and the "step 20" trigger acting via switch 297.

These gates and pulses are available, at the times described, in order to control the order of operation, within an electronic cycle, each of the above-mentioned program steps being equal to one electronic cycle of the primary timer. During this electronic cycle, certain selected operations can occur, for example, Reset, Add-Subtract Control, Transfer, and Carry.

If the particular function plugged to the program requires a Reset operation, this Reset occurs after the new program step is initiated at 2A time, the Reset operation beginning at 3A time and controlled by the "gate" +(3A—8B)G. During this Reset time, either a storage unit or the accumulator may be reset.

The +(10A)P, the +(11B—19B)P, and the +(20B—1A)G are utilized for Add-Subtract Control, Transfer and Carry. During Add-Subtract Control time, a determination is made as to whether the factor being read into the accumulator should be entered in True or in Complement form.

During the Transfer portion of the cycle, electronic Transfer between the storage units and the accumulator or vice versa, takes place, and the +(11B—19B)P pulses are used, in combination with a "gate" to select the required number of pulses, to be transferred.

All Carry operations in the accumulator take place during the carry portion of the cycle.

As an example, of the Reset operation, it is always necessary, before reading in to a storage unit, to Reset that storage unit, so that the first operation, in a storage Read-In function, is a resetting of the storage unit, by a +(3A—8B)G "gate."

The Reset circuit is illustrated in Fig. 1C. Upon application of a positive voltage, from a program "exit" hub to a GS1 Read-In hub labeled 300 in Fig. 1C, this positive voltage is applied to terminal "6" of a PS-8 type switch 301, to condition its grid 1, so that the +(3A—8B)G "gate" received over lead 254, will cause switch 301 to conduct which applies a pulse to an inverter 302 which then acts on the Reset circuit comprising the multigrid tube 303 and the pentode 304, as described in said Palmer et al. application, to cause the —100 volt Reset line 10, to rise to ground potential. This relatively positive pulse is applied to all the reset terminals of General Storage GS1 triggers (see terminal "4," Fig. 8, for example), to reset the triggers Off as described above.

Operations such as Add-Subtract Control, Transfer, and Carry always occur later in any particular electronic cycle than does Reset since Reset always starts at 3A time. Reset, therefore, is the earliest operation which takes place and it is to be noted that Reset occurs in the "active" part of a cycle.

Since the program ring is advanced at 2AB time, if, as described presently, the primary timer trigger "step 3" is not turned On because means are provided for returning the ring to primary timer trigger "step 2" rather than proceeding to "step 3" which is in the "active" part of the cycle, then the program ring can be rapidly advanced under control of the primary timer without performing the particular function allocated to that program step, from which it advanced. This is accomplished by means of the "delay steps" in the primary timer, under control of the novel skip and suppress circuit which will now be described.

Skip-suppress trigger

Figure 25:
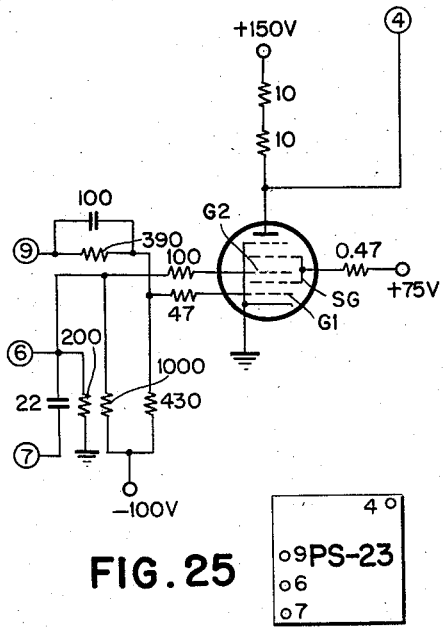

The right hand output terminal "7" of primary timer trigger "delay 3" (Fig. 1A) is not directly connected to trigger "step 3" but is connected through a lead 400 to an IN-5 type inverter 401 so that when trigger "delay 3" is turned Off, the negative pulse on lead 400 is inverted in inverter 401 and a positive pulse is applied, via lead 402, to terminal "7" of a PS-23 type switch 403 (see also Fig. 25). As shown in Fig. 25, there is connected between terminal "7" and terminal "6" a 22 micromicrofarad condenser. The positive pulse is thus fed from terminal "7" across the 22 micromicrofarad condenser to terminal "6" and from this terminal via a lead 404 (Fig. 1A) to a terminal "6" of another PS-23 type switch 408. The positive pulse is, therefore, effectively applied to the grids G2 of the respective switches 403 and 408, but only that one switch, whose grid G1 is conditioned, will conduct to thereby selectively either return to the "step 2" trigger, by operation of switch 403 or to operate the "step 3" trigger by operation of switch 408.

These switches are selectively operated as follows:

Connected to switch 403, via its terminal "9" and a lead 410, is the right hand output of a TR-1 type skip-suppress trigger 415, while connected to switch 408 via its terminal "9" and a lead 417, is the left hand output of this skip-suppress trigger.

When the skip-suppress trigger 415 is turned On, its right hand output terminal "7" goes positive and plus is fed over lead 410, to "condition" grid 1, of switch 403, connected to its terminal "9" (see also Fig. 25). The coincidence between the positive conditioning voltage, from the skip-suppress trigger, on grid 1, and the positive pulse, from the primary timer trigger "delay 3," on grid 2, produces conduction in switch 403. Its negative output at its terminal "4" is fed back, via lead 420 to terminal "8" of primary timer trigger "step 2," turning it On, by plate pullover, in the manner as described above. It is to be noted that "step 3" of the primary timer was not turned On, when trigger "delay 3" was turned Off so that the "active" portion of the primary cycle was never initiated and no function is effected. Thus an effective suppressing of a program step has been produced.

If, however, the skip-suppress trigger 415 is Off, its left hand output is positive, and plus is fed via lead 417 to the terminal "9" of switch 408 to condition its grid 1. The coincidence between this positive conditioning voltage, from the skip-suppress trigger, on grid 1, and the positive pulse from the primary timer trigger "delay 3," on grid 2, produces a negative pulse at the output "4" of switch 408 which is fed, via lead 421, to terminal "7" of the primary timer trigger "step 3," turning it On by plate pullover. Thus, if the skip-suppress trigger is Off, the primary timer will advance from trigger "delay 3" step to trigger "step 3," but if it is On, the primary will go from trigger "delay 3" step back to trigger "step 2," thus producing "suppress," as stated above. Thus it will be clear that to begin a suppress operation, it is only necessary to provide means for turning On the skip-suppress trigger 415, while to end a suppress operation, the skip-suppress trigger 415 must be turned Off. As will be clear from the more detailed description which follows, a "skip" operation will also be likewise initiated or ended. As stated above, the term "suppress" is employed to designate moving past "one" program step, without performing the plugged program function while the term "skip" is employed to designate moving past two or more program steps, without performing the plugged program functions.

Turning on the skip-suppress trigger

The right-hand input terminal "3" of skip-suppress trigger 415 (Fig. 1A) is connected by a lead 425 to the commonly connected output terminals of the OR-4 type "Or" circuit 426. The left-hand input to "Or" 426 is via a lead 429 from the right-hand output terminal "7" of a TR-1 type, suppress trigger 430, while the right-hand input to "Or" 426 is connected via a lead 431 from the right-hand output terminal "7" of a TR-1 type, skip trigger 432.

As previously stated, a positive potential, applied to the input of either or both inverters of an "Or" circuit results in a negative shift at the commonly connected output terminals. If suppress trigger 430 is On, its right-hand output terminal "7" is positive and this positive potential is applied, via lead 429, to the left-hand input of "Or" 426. The negative potential produced, at the output terminal "Or" 426 is then applied, via lead 425, to the right-hand input terminal "3" of skip-suppress trigger 415, turning it On. If skip trigger 432 is On, the positive voltage at its right-hand output terminal "7" is applied via lead 431 to the right-hand input of "Or" 426 and the negative shift created at the output terminal of "Or" 426 is applied via lead 425, to turn the skip-suppress trigger 415 On. However, it is to be particularly noted that if both the suppress trigger 430 and the skip trigger 432, are Off, the two inputs to "Or" 426 are negative so that the common output is positive, and thus the skip-suppress trigger will not be turned On. However, it is to be particularly understood, as described later, that both the suppress trigger 430 and the skip trigger 432 can not be turned On, at the same time.

Turning off the skip-suppress trigger

The left-hand input terminal "6" of the skip-suppress trigger 415 (Fig. 1A) is connected by a lead 435 to a PS-1 type switch 436. Connected to its grid 2 via terminal "7" is a lead 438 from the left-hand output terminal "8" of suppress trigger 430. The left-hand output terminal "8" of skip trigger 432 is connected via lead 439 to grid 2 of switch 436 through its input terminal "9." When suppress trigger 430 is Off, it applies a positive potential via lead 438 to grid 2 of switch 436, and when skip trigger 432 is Off, it applies a positive potential through lead 439 to grid 1 of switch 436. The coincidence of the two positive voltages at its inputs creats a negative shift at the output of switch 436 which is applied, via lead 435, to turn Off, the "skip-suppress" trigger 415. It can thus be seen that only when both the suppress trigger 430 and the skip trigger 432 are off, will the "skip-suppress" trigger 415 be Off.

Resetting the suppress trigger

The left-hand input terminal "6" of suppress trigger 430 (Fig. 1A) is connected via lead 445 to the output terminal "7" of an IN-4 type inverter 446 whose input terminal "5" is connected via lead 447 to the output terminal "7" of primary timer trigger "delay 1." At D1A time (see Fig. 2) the positive shift at terminal "7" of trigger "delay 1" is inverted to a negative shift by inverter 446 and is applied through lead 445, to Reset the suppress trigger 430 Off.

Turning on the suppress trigger

Connected to the right-hand input terminal "3" of the suppress trigger 430 via a lead 450 is the output terminal "4" of a PS-1 type switch 451. Connected to grid 2 of switch 451, via its terminal "7," is a lead 452, from the right-hand output terminal "7" of primary timer trigger "delay 2." Input terminal "9" of switch 451, connected to its grid 1, is connected via a lead 454, to the output terminal "7" of an IN-5 type inverter 455. The input terminal "5" of inverter 455 is connected via a lead 456 to the output terminals "4" of PS-8 type switches 460 and 461 and input terminal "5" of 455 is also connected to output terminal "7" of an IN-13 type inverter 462 whose input terminal "5" is connected via line 471 to a Suppress No Test hub 470. These elements are connected effectively as an Or circuit, which operates in a manner described previously in relation to Fig. 28.

When any of the elements 460, 461 or 462 is actuated, the commonly connected lead 456 goes negative. The negative shift is inverted by inverter 455 and the resulting positive output potential at terminal "7" is applied, via input terminal "9" of switch 451 to condition its grid 1. Grid 2 of switch 451 is fed to a positive pulse through lead 452 and input terminal "7" when trigger "delay 2" goes On, which is at D2A time (see Fig. 2). A coincidence of positive voltages at the input terminals of switch 451 causes a negative shift at its output terminal "4" which is applied via input terminal "3" to suppress trigger 430, turning it On. It can thus be seen that if any one of the three elements 460, 461 and 462 is operated, it will condition the switch 451 and permit a D2A pulse to pass through the switch 451, turning On suppress trigger 430 and performing a suppress operation.

The means for operating the three elements 460, 461 and 462 will now be described. Assume that program step 10 is to be suppressed. In that case, a wire would be plugged from one of the program hubs 10, (of program step 10) in Fig. 1B, to the Suppress No Test hub 470 (Fig. 1A). At 2AB time, of program step 10, a positive voltage will be applied from one of the program hubs 10 and via this hub 470 and lead 471 to the input terminal "5" of inverter 462. This positive voltage will operate inverter 462 and thus perform a suppress operation, as described above.

Another means for picking up the Suppress No Test hub 470 and performing a suppress operation, is by connecting hub 470 by plugging to a calculator selector pick up hub (not shown) as described in said Palmer et al. application. As described therein, calculator selectors are provided which can be energized by sensing a punched hole in a card. The calculator selector selects a calculator selector pick up hub, which may or may not be energized, depending upon whether the suppress operation is wanted.

It may be desirable to suppress a program step based on a balance test taken in previous program step and such a balance test operation is described in detail in said Palmer et al. patent. When a balance test for step suppression is plugged, to let us say program step 9, it develops either a Plus Voltage On Minus Balance or a Plus Voltage On Plus Balance. This Plus Voltage On Minus Balance is applied via line 480 to terminal "9" of the switch 460 (Fig. 1A) while the Plus Voltage On Plus Balance is applied via line 481 to terminal "9" of switch 461. If it is desired to suppress on negative balance on step 10 of the program, program hubs 10 would be plugged to apply plus to the Suppress On Negative Balance hub 485 (Fig. 1A) and thus via line 486 to terminal "6" of switch 460. Coincidence of the Plus Voltage On Minus Balance, from the previous test at terminal "9" of switch 460 and the just described positive voltage from the program hubs applied to its terminal "6" will cause switch 460 to conduct and create a negative shift at its output terminal "4" which is used as previously described, to cause a suppress operation. If a Suppress On Positive Balance is desired, the Suppress On Positive Balance hub 487 (Fig. 1A) is connected to a program hub 10 (Fig. 13) and since Plus Voltage On Plus Balance is applied to line 481 and thus to grid 2 of switch 461, with plus also applied via hub 487 to grid 1 of switch 461, it operates similar to switch 460, to cause a suppress operation.

Turning on the skip trigger

Connected to the right-hand input terminal "3" of the skip trigger 432 (Fig. 1A) through a lead 500, is the output terminal "4" of a PS-14 type switch 501. Connected to grid 2 of switch 501 via its terminal "6" is a lead 502 from Skip On hub 503. Input terminal "9" of switch 501, connected to grid 1, is connected through a lead 504 to the commonly connected output terminals "7" of an &-5 type "And" circuit 507. Connected to the left-hand input terminal of "And" circuit 507 via a lead 508 is the right-hand output terminal "7" of suppress trigger 430 and connected to the right-hand input terminal of "And" circuit 507 via lead 510 is the left-hand output terminal "8" of primary timer trigger "delay 3."

When suppress trigger 430 is Off, a negative voltage is applied, via said lead 508, to condition the left-hand input of "And" circuit 507. At D3A time, a negative D3AB pulse will be applied from the "delay 3" trigger via lead 510, to the right-hand input of "And" circuit 507. The coincidence of the two negative voltages, causes the "And" circuit 507 to produce, in a manner previously described, a positive voltage at its output, which positive voltage is fed via lead 504 to the input terminal "6" and thus grid 2 of switch 501. Grid 1 of switch 501 will go positive, only at D3A time, when Suppress is not wired.

Assume that a skip operation is to start on program step 10. In that case, a wire would be plugged from one of the program hubs 10, in Fig. 1B, to the Skip On hub 503 (Fig. 1A). At 2AB time, of program step 10, a positive voltage will be applied from the program hubs 10 through this Skip On hub 503 and via lead 502 and input terminal "6" will condition grid 2 of switch 501. With grid 2 conditioned, a +D3AB pulse on grid 1, produced as described above will cause switch 501 to conduct and thus apply a negative pulse via lead 500 to turn On the skip trigger 432.

Turning off the skip trigger

Connected to the left-hand input terminal "6" of the skip trigger 432 (Fig. 1A) via a lead 515, is the output terminal "4" of a PS-14 type switch 516. Connected to grid 2 of switch 516 via its input terminal "6" is a lead 517 from Skip Off hub 518. Input terminal "6" of switch 516 connected to its grid 2, is connected to the same lead 504 which was positive at D3A time when the suppress trigger was Off. Assume that a skip operation is to end on program step 14 and a wire has been plugged from one of the program hubs 14 to the Skip Off hub 518 (Fig. 1A) from which potential is applied to the input terminal "6" to thus condition grid 2 of swich 516 via lead 517. With grid 1 conditioned, the +D3AB pulse applied via line 504 to input terminal "9" and thus to grid 1, causes switch 516 to conduct and apply a negative pulse via lead 515, to turn Off the skip trigger 432.

Thus it will be particularly noted that to skip a group of program steps, it is only necessary, to plug the first step to be skipped, to the Skip On hub 503 which will operate the skip trigger 432 to flip On the Skip-Suppress trigger 415 to initiate a skip function, while the next active step is plugged to the Skip Off hub 518 which will operate the Skip trigger 432 to flip Off the Skip-Suppress trigger 415 to thus terminate the skip function.

*Suppressing the skip operation*

Means are also provided for suppressing the skip operation, which is effectively a means for selecting whether or not a skip operation shall be performed in a given series of calculations. As has been described, neither the Skip On switch 501 (Fig. 1A) nor the Skip Off switch 516 can be energized, unless the Suppress trigger 430 is off. Therefore, the skip trigger 432 can never be turned On, if a suppress operation is called for. It will thus be clear that any of the previous methods which has been described for selecting a suppress operation can, in turn, be used to determine whether a skipping operation will or will not be performed. Thus, if steps 10 to 15 of the program have been plugged for skipping, a balance test can be performed on step 9 and the result thereof, can be utilized to determine whether the skip operation shall or shall not be suppressed.

There has therefore been described novel means for producing in a rapid manner, suppress operations when desired, or the rapid skipping of several steps of a program, as well as means for suppressing such a previously plugged skip function.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a computer, a ring of cascaded bistable elements comprising a drive bistable element, at least one delay bistable element and a plurality of functional bistable elements, means initiating sequential operations of said ring elements, one complete sequential operation of the drive, delay and functional bistable elements of said ring comprising a normal ring operation, a series of cascaded bistable elements connected to said drive bistable element of said ring, the operation of said drive element initiating sequential operations of the series bistable elements, means for selectively producing the skipping of the operations of the functional bistable elements, said skipping producing a shortened ring operation, means controlled by each element of said series of bistable elements for cooperating with selective functional elements of said ring for controlling different computer operations, said shortened ring operation thereby operating the element of the series without performing its associated computer operation.

2. A device as in claim 1, and including means connecting said ring operation shortening means to different bistable elements of said series whereby said shortened ring operation may be started by a predetermined one of said series bistable elements and terminated by another predetermined one of said bistable elements.

3. A device as in claim 2 and including means for selectively suppressing the starting of the shortened ring operation.

4. A device as in claim 3 and including test means connected to an element in the series before said predetermined starting one, said test means controlling said suppressing means.

5. In combination, a ring of operable elements normally connected for a sequential stepping operation of each of said elements, means for initiating the sequential stepping operations of said ring elements, a series of operable elements connected to a driving one of said operable elements of said ring, each operation of said driving element initiating a sequential stepping operation of the elements of said series, means for shortening the ring operation, each shortened ring operation including an operation of said driving element whereby the elements of said series are operated at an increased rate, and means connected to the bistable elements of said series for controlling said ring operation shortening means.

6. In combination as in claim 5, said last mentioned means including means connected to the first of the elements of said series to be operated at an increased rate for starting the ring shortening operation, and means connected to the last of the elements of said series to be operated at an increased rate for ending the ring shortening operation.

7. In combination as in claim 6 and means for selectively suppressing the starting of said ring shortening operation.

8. In a calculator adapted to solve problems through the performance of successively programmed arithmetic steps, a program system comprising, in combination, a plurality of sub-program means, each of which when actuated controls the performance of a particular portion of an arithmetic step in a problem to be solved by said calculator, a plurality of program function means, each of which, when actuated, controls the performance of a particular step in the problem by conditioning predetermined sub-program means for actuation, only those sub-program means being conditioned which are necessary to perform the particular step, a source of pulses, a ring of bistable elements including a series of delay bistable elements followed by functional bistable elements, said functional elements connected in groups to any one of the sub-program operation means, circuit means connected to said ring for applying said pulses to initiate sequential individual operations of said bistable elements, said functional elements of said ring, when operated, actuating the conditioned sub-program means to which they are respectively connected, a chain of bistable elements, said chain elements being individually selectively connected to a program function means, said chain also being selectively connected to a drive one of the functional elements of said ring whereby the operation of said one drive element initiates sequential individual operations of said chain elements, said one element being normally operated once for every complete cycle of the ring, said delay elements following said one element in said ring, said elements of said chain when operated actuating the program function means to which they are respectively connected, means for selectively interrupting said sequential operatoins at the end of said series of delay elements of said ring, and means initiating new sequential operations at said one drive element, when said first ring operations are interrupted, to rapidly initiate sequential individual operations of said chain bistable elements to effect rapid skipping of said problem steps by rapidly advancing through said problem steps without performing the sub-program operations within said problem steps.

References Cited in the file of this patent

UNITED STATES PATENTS

| 2,560,968 | MacSorley | July 17, 1951 |
| 2,596,741 | Tyler et al. | May 13, 1952 |
| 2,623,171 | Woods-Hill et al. | Dec. 23, 1952 |

FOREIGN PATENTS

| 583,266 | Great Britain | Dec. 13, 1946 |